United States Patent
Schuster et al.

(10) Patent No.: US 6,360,271 B1
(45) Date of Patent: Mar. 19, 2002

(54) SYSTEM FOR DYNAMIC JITTER BUFFER MANAGEMENT BASED ON SYNCHRONIZED CLOCKS

(75) Inventors: Guido M. Schuster, Des Plaines; Ikhlaq S. Sidhu, Vernon Hills; Michael S. Borella, Naperville; Jacek A. Grabiec, Chicago, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/241,689

(22) Filed: Feb. 2, 1999

(51) Int. Cl.[7] .......................... G06F 15/16; H04L 12/56
(52) U.S. Cl. ........................ 709/231; 370/516; 710/52; 713/401
(58) Field of Search ........................ 370/516; 713/401; 710/52; 709/231, 234

(56) References Cited

U.S. PATENT DOCUMENTS

| | | | |
|---|---|---|---|
| 4,076,964 A | * 2/1978 | Henrion et al. | 370/517 |
| 5,072,442 A | * 12/1991 | Todd | 370/265 |
| 5,091,905 A | * 2/1992 | Amada | 370/415 |
| 5,402,424 A | * 3/1995 | Kou | 370/324 |
| 5,534,937 A | * 7/1996 | Zhu et al. | 348/845.1 |
| 5,640,388 A | * 6/1997 | Woodhead et al. | 370/468 |
| 5,805,602 A | * 9/1998 | Cloutier et al. | 370/516 |
| 5,996,018 A | * 11/1999 | Duault et al. | 709/234 |
| 6,029,252 A | * 2/2000 | Manning | 713/556 |
| 6,081,844 A | * 6/2000 | Nowatzyk et al. | 709/233 |
| 6,161,160 A | * 12/2000 | Niu et al. | 710/129 |

OTHER PUBLICATIONS

"Internet Delay Measurements using Test Traffic Installing and hosting a Test Box", Henk Uijterwaal, RIPE NCC, http://www.ripe.net/test-traffic/Notes/RIPE_168/note.html (Mar. 1998).

"Internet Delay Measurements using Test Traffic Design Note", Henk Uijterwaal and Olaf Kolkman, RIPE NCC, http://www.ripe.net/test-traffic/Notes/RiPE_158/ (May 1997).

"A One-way Delay Metric for IPPM", Almes et al., Advanced Network & Services, *Network Working Group*, http://www.ietf.org/internet-drafts/draft-ietf-ippm-delay-05.txt (Nov. 1998).

"Internet Protocol Performance Metrics—Evolution through Understanding", http://www.advanced.org/ippm.html (Aug. 1997).

"Test Traffic Project Homepage", Henk Uijterwaal, RIPE NCC, http://www.ripe.net/test-traffic/ (Nov. 1998).

"QoS Routing Mechanisms and OSPF Extensions", Guerin, et al., *Internet Engineering Task Force* (Dec. 1998).

"Designing QoSMIC: A Quality of Service sensitive Multicast Internet protocol", Banerjea et al., Internet-Draft, Inter-Domain Multicast Routing (Apr. 1998).

* cited by examiner

*Primary Examiner*—Krisna Lim
(74) *Attorney, Agent, or Firm*—McDonnell Boehnen Hulbert & Berghoff

(57) ABSTRACT

A system for dynamically jitter buffering a sequence of packets based on substantially synchronized time signals maintained at the transmitting and receiving ends of a communication system. The time signals may be synchronized, for instance, by equipping both the transmitting and receiving ends with global positioning system receivers. The transmitting end may mark each outgoing packet with a sender-time based on the time signal at the transmitting end. Dynamic jitter buffering may then be provided by scheduling delayed play-out of each packet. For instance, the jitter buffer at the receiving end may be configured to delay play-out of each packet until the time signal at the receiving end indicates a time that is substantially a predetermined end-to-end delay period after the sender-time for the packet.

36 Claims, 5 Drawing Sheets

SYSTEM FOR DYNAMIC JITTER BUFFER MANAGEMENT BASED ON SYNCHRONIZED CLOCKS

RELATED APPLICATIONS

The present document is related to two other U.S. patent applications filed on the same date, each in the name of the same inventors. The other two applications are entitled "System for Adjusting Billing for Real-Time Media Transmissions Based on Delay" and "System for Routing Real-Time Media Transmissions Based on Delay." The entirety of each of these other applications is hereby incorporated herein by reference.

BACKGROUND OF THE INVENTION

1. Field of the Invention

The present invention relates to the transmission of real-time media signals over data networks and more particularly to a method and apparatus for using absolute time information and/or other parameters to assess, improve and manage such transmission. The invention is particularly useful in the context of IP networks such as the Internet or an intranet. However, the invention is not limited to use in this context but extends more generally to use in the context of any store-and-forward network such as any packet switched network, including, for instance, ATM, frame relay, X.25 and SNA networks.

2. Description of Related Art

There has long been a need in the art to transmit real-time media signals from one location to another. In early days, the need to convey voice signals was satisfied through the use of relatively simple analog telephone systems. More recently, the availability of digital telephone systems and advanced computer networks such as the Internet has facilitated the communication of assorted real-time media signals, such as voice, audio and/or video over long distances at a fraction of the cost of conventional systems. Currently, there are two types of networks that can be used to convey real-time media signals, circuit switched networks and packet switched networks.

In a circuit switched network, a point-to-point communication path or circuit is established between two or more users, such that the users have exclusive and full use of the circuit until the connection is released. A media signal to be transmitted is then sent in whole over the dedicated circuit, received by the other side and played out to a user. The public switched telephone network is an example of a circuit switched network.

In a packet switched network, in contrast, a message to be sent is divided into blocks, or data packets, of fixed or variable length. The packets are then sent individually over the network through multiple locations, and then reassembled at a final location before being delivered to a user at a receiving end. To ensure proper transmission and re-assembly of the blocks of data at the receiving end, various control data, such as sequence and verification information, may be appended to each packet in the form of a packet header, or otherwise associated with the packet. At the receiving end, the packets are then reassembled and transmitted to an end user in a format compatible with the user's equipment. The Internet is an example of a packet switched network.

At their inception, each type of telecommunications network was designed to support the transmission of select types of media. Circuit switched networks were designed to carry real-time audio signals (e.g., voice). Packet switched networks, on the other hand, were designed to carry pure data signals (e.g., e-mail). Today, however, these networks compete to provide multi-media transmission services, including, for instance, the transmission of data, voice, audio and/or video. Further, with the growth of the Internet and other advances in technology, packet switched networks are now competing with conventional circuit switched networks to provide interactive communications services such as telephony and multi-media conferencing. In the context of packet switched networks operating according to Internet Protocol (IP), this technology is presently known as internet telephony, IP telephony or, where voice is involved, Voice over IP (VoIP).

Internet telephony presents an attractive technology for use in long distance telephone calls, as compared to the public switched telephone network (PSTN), which has been the traditional transmission medium. One of the primary advantages of internet telephony is its flexibility and features, such as the ability to selectively provide different levels of service quality and to integrate voice and data services (for instance, integrating e-mail and voice mail functions).

Another primary advantage of internet telephony is cost. In the United States, for instance, long distance service providers for the PSTN provide domestic services at rates ranging from roughly 10 to 30 cents per minute, and international rates for substantially more, depending on the time of day, day of the week, and the distances involved. In contrast, the cost of an internet telephony call anywhere in the world is potentially the cost of a local telephone call to a local internet telephony service provider at one end and the cost of a local call from an internet telephony service provider at the far end to the destination telephone. Once the call is routed from the local internet telephony provider onto the IP network, the cost to transmit the data from the local internet telephony provider to the far end internet telephony provider can be free for all practical purposes, regardless of where the two parties are located. Similarly, the cost to facilitate a direct dial internet telephony call can theoretically be free, except for possible access fees charged by local exchange carriers. Internet telephony service providers can thus potentially charge users far less for internet telephony calls than the users would pay for comparable calls placed strictly over the PSTN.

To transmit a real-time media signal over a packet switched network, the media signal is typically first sampled, divided into frames, and channel coded or compressed according to an established media coding standard. Each encoded frame of data is then inserted as payload into a packet, which is then labeled with one or more headers (often depending on various transmission protocols). The header usually identifies a packet sequence number, a source and destination network addresses for the packet, and a sender timestamp.

In general, a purpose of the sender timestamp is to record the time spacing between packets in a sequence. Therefore, the sender timestamp may identify any suitable time at the transmitting end, consistently for the packets in a sequence. For instance, without limitation, the sender timestamp may identify when the first sample of the payload in a packet was taken or when the packet was sent into the network.

In this regard, each packet of a real-time media sequence typically represents a successive time block of the underlying media signal. For instance, according to the G.723.1 standard, a 16 bit PCM representation of an original analog speech signal is partitioned into consecutive segments of 30 ms length, and each of these segments is encoded into a frame of 240 samples, represented by either 20 or 24 bytes (depending on a selected transmission rate). The time spacing between each of these frames is significant, as it serves in part to define the underlying signal. For example, under G.723. 1, it is important to know that a sequence of four packets were transmitted at times t, t+30, t+60, and t+90. With this inter-packet time spacing information and sequence number information, a receiving device ideally should be able to reconstruct the packet sequence and decode and play out the underlying signal.

As a stream of real-time media packets is created, each packet is sent independently into the network and routed to the receiving end as identified by the destination address in the packet header. The packets may be sent back to back or with a holding time between packets. Ideally (excepting packet loss, for instance), each packet will then traverse the network and arrive at the destination end, to be decoded and played out to an end user.

As is well known in the art, the transmission of any data signal from one location to another over a telecommunication; network is generally not instantaneous but rather involves some end-to-end (e.g., user to user) delay or latency. This end-to-end delay may depend on a number of factors, including, for instance, the available network bandwidth, the current network load, the distance between transmitter and receiver, the number of processing points (e.g., switches, routers and buffers) encountered prior to media play-out, and the processing time delay required at each processing point.

In the context of interactive real-time communications such as internet telephony, delay is particularly problematic, since participants to such communications expect the network connection to simulate immediate, in-person interaction, without delay. Provided with more than a maximum tolerable end-to-end delay (a matter of design choice), conversation participants may be faced with the unsettling experience of having to wait some time after one person speaks before the other person hears what was spoken. Consequently, in most telecommunications networks carrying real-time media signals, there is a need to reduce or minimize the total end-to-end (e.g., user-to-user) transmission delay.

Further, because each packet in a stream representing a real-time media signal is routed independently, multiple packets in the stream may traverse the network from originating end to destination end by different routes. These routes may be of varying lengths and may include varying numbers of packet switches and routers that operate on the packets. Consequently, the various packets in a given stream may experience diverse levels of propagation delay (also known as "delay variance" or "jitter") and will thus typically arrive at the destination address with varying inter-packet time-spacing. This varying inter-arrival time spacing is especially disruptive to real-time media communications, as it can give rise to packet loss, which produces audible pops and clicks and other distortion. Therefore, there is a need to reduce the effect of jitter on real-time media transmissions.

In an effort to mask network-induced expansion and contraction of packet inter-arrival times, the packets that arrive at the destination end are typically received by a playout buffer or jitter buffer. The jitter buffer operates by holding packets for a period of time and then successively releasing them to be played out in sequential order, ideally with inter-packet time spacing corresponding to the inter-departure time spacing that was employed at the originating end.

The size of the jitter buffer bears on its effectiveness and involves a trade-off between increased end-to-end transmission delay and increased packet loss (and resultant distortion). A large jitter buffer can theoretically respond to large delay variances, as it can maintain packets for a longer period of time and thus release a packet for decoding with a high probability that the next packet in the sequence can be subsequently released with the appropriate inter-packet time spacing. However, by its very nature, the jitter buffer directly contributes to the total end-to-end transmission delay by holding packets before they are played out. Therefore, the larger the jitter buffer, the more the real-time media communication may be distorted from delay.

On the other hand, a small jitter buffer would be less likely to delay end-to-end real-time media transmission. Unfortunately, however, the length of buffer processing time bears an inverse relationship to the media frame loss: as buffer processing time decreases, media frame loss attributable to the buffering process increases. A small jitter buffer can also distort a real-time media transmission, since packets that arrive too late to be processed (e.g., after the previous packet has already been released for play out) may be deemed lost. Consequently, as quality of service is increased by a decrease in buffer contribution to end-to-end transmission delay, quality of service is simultaneously decreased by the increase in media frame loss caused by the buffer. Therefore, in designing a jitter buffer, a delicate balance exists between delay and packet loss.

Buffer processing algorithms may use estimates of network transmission delay when making the tradeoff decision between additional processing delay and additional media frame loss. In general, such delay estimates either are computed on a case-by-case basis from observed standard deviation of network delay or are pre-set based upon a selected standard value. For instance, in a given network, a transmission line element may periodically transmit a timestamped test packet to a remote element and arrange to have the remote element return the packet to the line element. The line element may then determine a round trip transmission delay for the test packet by comparing the initial timestamp with the time when the packet returns. In turn, the line element may estimate that the one-way transmission delay is half of this round-trip transmission delay. By repeating this process periodically, for instance, the line element may establish a statistical estimate (e.g., average, mean, etc.) of the one-way transmission delay in the network. Assuming a maximum tolerable end-to-end transmission delay (including the time a packet could be held in the jitter buffer before being played out), the line element may then set its jitter buffer size to be the difference between the maximum tolerable end-to-end transmission delay and the one-way network transmission delay.

Packet switched real-time transmission schemes can use one of these delay estimates. However, these estimates of network transmission delay are imperfect and can therefore give rise to inefficiency in the buffer tradeoff decision and a resulting decrease in quality of the media signal played out at the receiving end. For instance, it is possible that the transmission delay in one direction between two line elements may be much higher than the transmission delay in the other direction between the two elements. Therefore, half of the round trip delay between these elements is not necessarily representative of a one-way transmission delay between the elements. Consequently, using such estimates as a basis for setting jitter buffer size can result in oversized or undersized jitter buffers and can cause packet loss or excessive (e.g., unnecessary) delay and therefore limit the overall quality of real media service deliverable over switched-packet networks.

In view of the deficiencies in the existing art, a need therefore exists for an improved method of assessing, improving and managing real-time media transmission over switched-packet networks.

SUMMARY OF THE INVENTION

The present invention provides a method and apparatus for establishing, providing and/or facilitating improved buffering, billing and/or routing of real-time media signals.

According to one aspect of an exemplary embodiment, for instance, the receiving and transmitting ends for a real-time media transmission may maintain substantially synchronized time signals. These time signals may be substantially synchronized by any suitable mechanism such as by originating from a common clock. Provided with synchronized clock signals, it is possible to make a substantially accurate and appropriate measurements and adjustments in the transmission system. Exemplary measurements include network transmission delay and packet delay variance (i.e., jitter). Exemplary adjustments include changing the jitter buffer size at the receiving end, changing the fees charged for a given transmission, and changing (or selecting) the routing for a given real-time media signal.

Network transmission delay may be measured, for instance, by comparing packet departure time with packet arrival time (or other benchmarks or timestamps provided at the transmitting and receiving ends), as indicated by the synchronized time signals at the transmitting and receiving ends. Packet delay variance may be measured (approximated), for instance, by comparing the differences between network transmission delays for packets in a sequence. Statistically, the variance is then the square of the estimated standard deviation of a population of delay measurements. Of course, other modifications or estimates of variance may be used in addition or instead.

Jitter buffer size and jitter buffer operation may be dynamically altered in order to provide substantially the same inter-packet time spacing at the receiving end as existed or was established at the transmitting end. This may be done, for instance, by having the receiver delay play-out of successfully transmitted packets until the time signal at the receiving end indicates a time that is substantially a predetermined end-to-end delay period after a benchmark time for the packet at the transmitting end.

Since delay and/or jitter can bear directly on the quality of real-time media transmission, a service provider may adjust the fees that it charges for such transmission, based on a measure of transmission delay and/or jitter. These measurements are preferably but not necessarily based on substantially synchronized time signals at the transmitting and receiving ends. Further, the measurements may be taken generally or, preferably, with respect to the very signal(s) as to which the service provider may charge a fee. Based on these measurements, for instance, if a network is experiencing particularly high delay and/or jitter, the service provider may decrease its fee or otherwise alter its fee schedule.

Similarly, a transmitting end may use delay and/or jitter measurements as a basis for selecting a transmission path over which to route a given real-time media signal. Again, these measurements are preferably but not necessarily based on substantially synchronized time signals at the transmitting and receiving ends. For instance, a transmitting end may regularly monitor the delay and/or jitter for transmissions over a plurality of transmission paths that can be used to convey a real-time media signal to a receiving end. For transmission of a given signal, the transmitting end may then select the transmission path having the lowest delay and/or jitter. As a particular example, for instance, if an Internet telephony gateway determines that the Internet is particularly congested and may substantially delay the transmission of telephone signals, the gateway may opt to route a given telephone signal over the PSTN instead of over the Internet.

The foregoing, as well as other advantages and features of the present invention, will become apparent to those skilled in the art by reading the following detailed description, with reference where appropriate to the accompanying drawings.

BRIEF DESCRIPTION OF THE DRAWINGS

Preferred embodiments of the present invention are described herein with reference to the drawings, in which.

DETAILED DESCRIPTION OF THE PREFERRED EMBODIMENTS

As indicated above, the present invention provides a method and apparatus for improved buffering, billing and/or routing of real-time media signals. In general, the real-time media signals are such as may be provided by an originating device or user, encoded into a sequence of packets and transmitted over a packet switched network from a transmitting end and destined to a receiving end. (In this regard, the present invention is equally applicable in the context of communications between three or more parties (such as in a multicast arrangement, for instance); however, the preferred embodiment is described with respect to two-party communication for ease of illustration.) At the transmitting end, each of the packets may be marked with a sender-time based on a first clock signal at the transmitting end. At the receiving end, packets that arrive successfully may be received by a jitter buffer, which may serve to adjust inter-packet time spacing and reduce transmission delay variance among packets. In turn the packets may be played out, for instance, to an end user or device. Examples of such real-time media signals include, without limitation, voice, video, audio, other voice-band signals (such as PCM-encoded fax signals, modem signals), and/or any combination or subset of these or other signals, whether alone or in combination with other real-time and/or data signals.

In a preferred embodiment, a second clock signal may be maintained at the receiving end and may be substantially synchronized with the first time signal at the transmitting end. As presently contemplated, two or more clock signals should be understood to be "substantially synchronized" when the clock signals are close enough to each other that it is possible to meaningfully measure delay with them, with reasonable accuracy. Therefore, the extent to which two or more clock signals can differ and yet still be considered "substantially synchronized" is a matter of reason. For example and without limitation, some people of ordinary skill in the art may consider up to 1 ms to be an acceptable difference between two substantially synchronized clock signals. Others may differ. (Hereafter, "substantially synchronized" may be abbreviated as simply "synchronized.")

Figure 1:
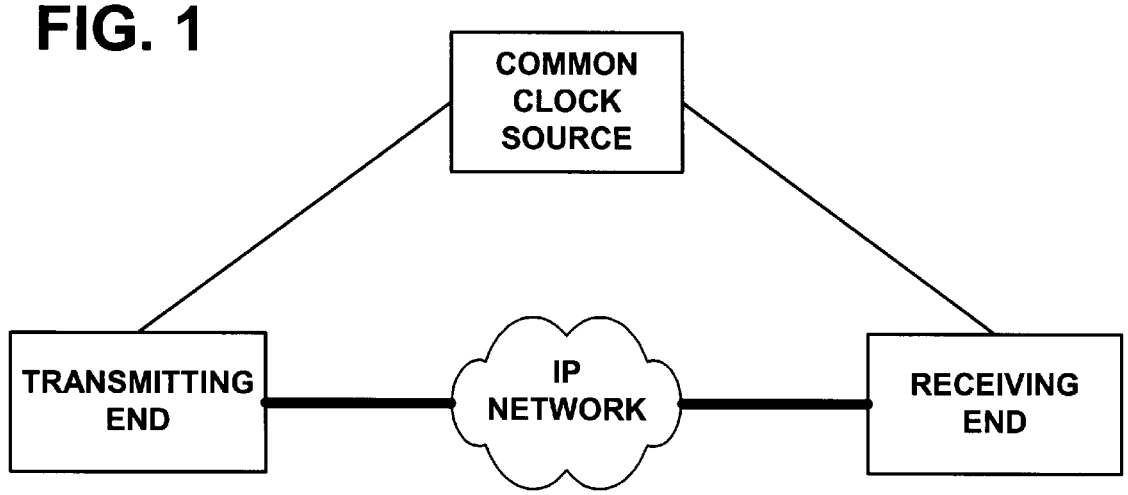
FIG. 1 illustrates the use of a common clock source to provide synchronized delay and/or jitter measurements for use in a preferred embodiment of the present invention.

These clock signals may be synchronized in any suitable fashion, such as by having both clock signals originate from a common clock source, as indicated in FIG. 1 by way of example. The common clock source itself need not necessarily be synchronized with another clock (such as an atomic clock) but should preferably provide a reliable time signal. The common clock source may take any suitable form, although a preferred clock source is a satellite-transmitted clock signal such as that provided by a global-positioning satellite (GPS) system. In this regard, both the transmitting and receiving ends may each include or be coupled with a GPS receiver, including for instance an antenna and the necessary circuitry and/or software known by those skilled in the art to facilitate receipt of a time signal from the GPS system. As another example, the clock signals may be synchronized by providing pre-synchronized atomic clocks within the transmitter and receiver. Other methods of synchronizing the clocks, now known or later developed, may be employed as well.

The second clock signal may be used to identify a receiver-time for each of a plurality of packets that arrive successfully at the receiving end. By thus employing substantially synchronized clock signals at the transmitting and receiving ends, it becomes possible to determine with great accuracy the network transmission delay of a given packet and/or the delay variance (jitter) among a plurality of packets and/or to adjust and manage various facets of the transmission system based on these delay and/or jitter measurements. As described herein, a measurement of delay or jitter taken based on synchronized clocks at the transmitting and receiving ends may be referred to as a "synchronized delay measurement."

In a preferred embodiment, accurate measurements facilitated by synchronized clock signals at the transmitting and receiving end may be used to provide improved jitter buffering of real-time media signals. More particularly, for instance, the synchronized clock signals can be used to substantially equalize the total end-to-end transmission period for each of a plurality of packets (e.g., in a sequence) and to thereby provide substantially the same inter-packet time spacing at the receiving end as existed or was established at the transmitting end. This can be done, for instance, by selecting a desired end-to-end delay period for a sequence of packets and then having the receiving end delay the play-out of each successfully transmitted packet in the sequence until the clock signal at the receiving end indicates a time that is substantially the selected delay period after the sender-time for the packet.

In this regard, for instance, the receiving end may employ its synchronized clock to determine a network transmission delay period for a packet, which may be the difference in time between the sender-time for the packet and the time when the packet first arrives at the receiving end (before buffering). The receiving end may then set the buffer delay period for the packet to be the difference between the predetermined end-to-end delay period and the network transmission delay. Upon expiration of the buffer delay period, the receiving end may then release the packet for play-out. By repeating this procedure for each of a plurality of successfully transmitted packet in a sequence, the end-to-end transmission delay for the packets can be substantially equalized, thereby substantially reducing jitter and improving transmission quality. (In addition, as presently contemplated, the receiving end may communicate its buffer delay selection(s) to the transmitting end, and the transmitting end may consider this delay information when deciding how much redundancy information to transmit with the payload. For example, the use of additional redundancy information can serve to remedy packet loss that could result from insufficient buffer delays at the receiving end.)

To perform this function with respect to a plurality of incoming packets, for instance, the receiving end may be configured to include a processor, a memory, and a second time signal substantially synchronized with the first time signal. Additionally, a device at the receiving end may include a plurality of machine language instructions that may be stored in the memory and may be executable by the processor to delay each of a plurality of the packets for a buffer period and to release each packet for play-out in response to the second clock signal indicating a time that is substantially a predetermined delay period after the sender-time for the packet.

As another example, for instance, the receiving device may (i) identify a receiver-time for the incoming packet, based on the second time signal, (ii) determine a network transmission delay for the incoming packet, based at least in part on a comparison between the sender-time and receiver-time for the packet, (iii) compute a buffer delay period for the incoming packet, based at least in part on a difference between the network transmission delay and a predetermined end-to-end transmission delay, and (iv) release the packet for play-out upon expiration of the buffer delay period. In this regard, it will be appreciated that the media frame carried by the packet may be decoded before and/or after expiration of the buffer delay period, depending on design choice.

Figure 2:
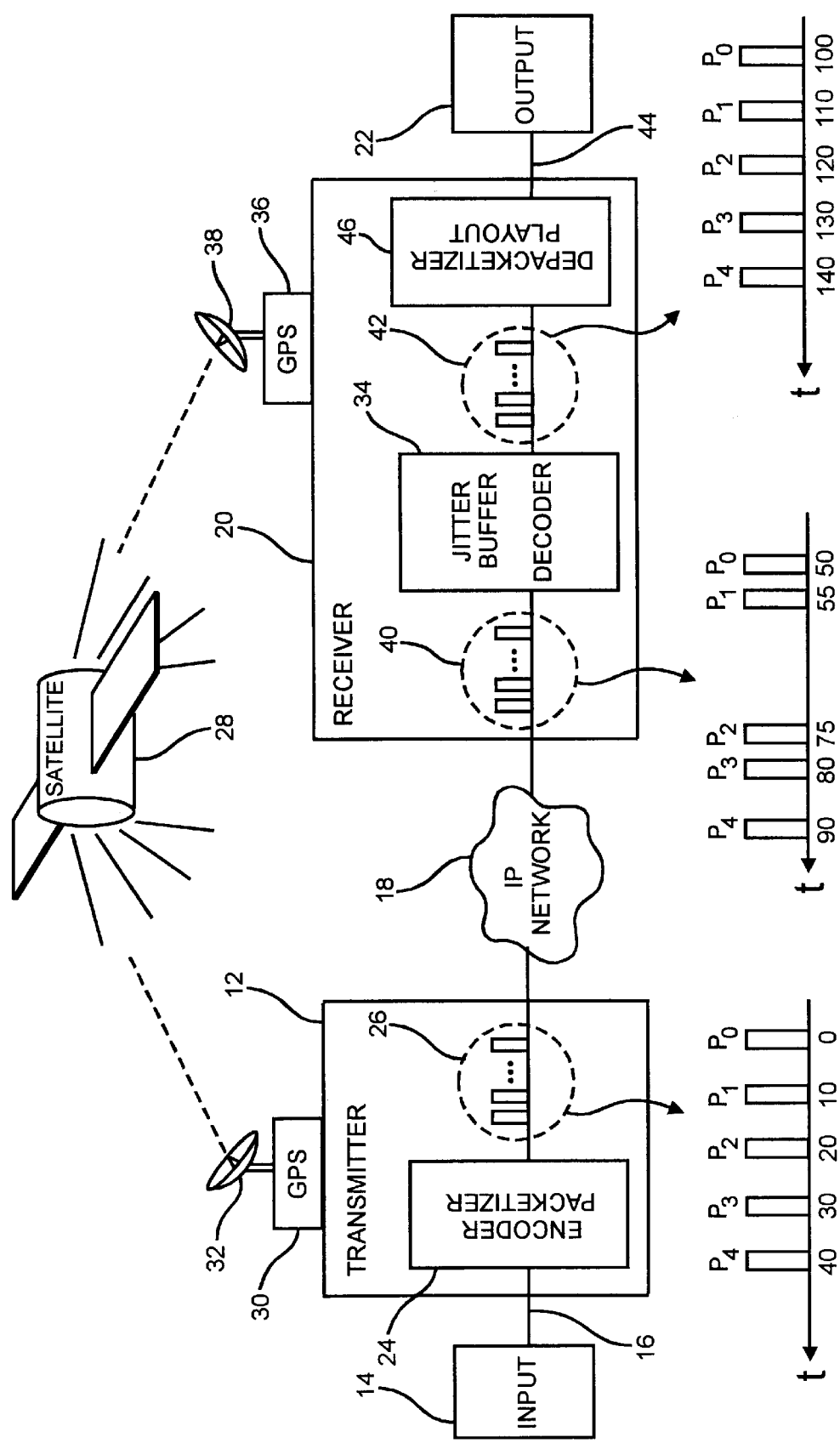
FIG. 2 illustrates the transmission and jitter buffer processing of an exemplary packet sequence in accordance with a preferred embodiment of the present invention.

FIG. 2 illustrates this scenario by way of example. As shown in FIG. 2, a transmitter receives a real-time media signal from an input medium (for instance, a voice signal spoken by a person talking on a telephone and conveyed to the transmitter via a suitable communications link). This real-time media signal is destined to be transmitted by way of a network (e.g., an IP network) to a receiver 20 and ultimately played out for receipt by an output medium 22 (e.g., a person on a telephone coupled with receiver 20 by a suitable communications link). The transmitter and receiver each preferably have a network address (e.g. IP addresses), referred to respectively as the source and destination addresses.

It will be appreciated that the input and output media 14 and 22 may alternatively engage in interactive communication, in which case the scenario depicted in FIG. 2 could be revised to be symmetric. In that case, for instance, transmitter 12 would also perform the functions of a receiver such as receiver 20, and receiver 20 would also perform the functions of a transmitter such as transmitter 12. Further, the principles described herein could be applied in either or both directions.

Transmitter 12 may employ an encoder to compress the real-time media signal if it is not already compressed.

Additionally, transmitter 12 may employ a packetizer to packetize the signal if it is not already packetized. The encoder/packetizer function is illustrated by block 24 in FIG. 2, although it will be appreciated that these may be separate elements. For instance, the signal may be packetized and then encoded or vice versa.

In one embodiment, the output from encoder/packetizer 24 is a packet stream 26, which represents the underlying media signal. Packet stream 26 is shown by way of example and without limitation to include packets $P_0$, $P_1$, $P_2$, $P_3$ and $P_4$, which are further illustrated by way of example and without limitation to be spaced at 10 ms intervals (which could be measured by the difference in time between the starting points of sequential packets, for instance). Each of these packets typically includes a payload portion and a header portion. The payload portion may include a frame of encoded samples representing a time block of the media signal (such as a 10 ms time block, as illustrated in FIG. 2). The header portion may indicate a variety of information about the packet, including the source and destination address, the packet sequence number, and a sender-time.

The transmitter preferably timestamps each packet with the sender-time in order to provide a reference for determining the relative time spacing of packets in the sequence and to thereby facilitate appropriate reconstruction of the packet sequence (also with the help of the packet sequence numbers) for play-out at the receiving end. At the transmitting end, the particular point at which the sender-time is generated is not critical. However, the point should preferably be consistent for packets in a sequence. Merely by way of example, without limitation, the sender-time for each packet may be (i) the time when the first digital sample of the frame carried by the packet was taken, (ii) the time when the packet was fully ready for transmission into the network, or (iii) the time when the packet was actually transmitted into the network from the transmitting end.

In the preferred embodiment, the transmitter applies this sender-timestamp based on a first time signal maintained at the transmitting end. This first time signal may be provided by a clock coupled with or included in the transmitter, and the clock may be pre-set and/or regularly set by suitable means. Alternatively, or additionally, the first time signal may be communicated to the transmitter from some external clock source, the particulars of which are not necessarily important. This external clock source may be considered an out-of-band clock source if it conveys the first time signal to transmitter 12 by some communication channel other than the network over which transmitter 12 will be transmitting the timestamped packets.

As shown by way of example in FIG. 2, this external clock source may be, or be provided by, a satellite system such as the GPS system, which is well known to those skilled in the art and therefore will not be described in detail herein. In general, the satellite system may include a satellite 28, which continuously emits a time signal that can be received and understood by appropriately configured equipment. Transmitter 12 then preferably includes or is coupled with a GPS receiver 30, including GPS antenna 32, for receiving the time signal. The time signal is preferably conveyed from satellite 28 as a universal time, such that any GPS receiver can receive substantially the same time reading at any given moment (excepting for miniscule differences in transmission from the satellite due, for instance, to differences in distance between the satellite and various GPS receivers).

Transmitter 12 transmits packet stream 26 into the network 18, one packet at a time. Each packet is then independently routed through the network, destined for receipt by receiver 20. Due to various factors such as differences in the circuits and transmission line elements traversed by individual packets, the packets may arrive at receiver 20 out of order and with varying transmission delays and consequently skewed inter-packet time spacing or jitter. (As is well known, some packet may also be lost during transmission, and numerous mechanism exist to correct for or respond to such packet loss). The receiver may use the packet sequence numbers to re-order the packets. At issue, however, is how to evaluate and remedy the jitter.

In an effort to remedy jitter, receiver 20 preferably includes or is coupled with a jitter buffer, shown by way of example as functional block 34 in FIG. 2. One way to remedy jitter is to establish a predetermined total end-to-end transmission time (e.g., from sender-time to play-out, for instance, or any other suitable range) and to then configure the jitter buffer to delay packet play-out for some time based on an estimate of the one-way network transmission delay between the transmitter and receiver. The predetermined total end-to-end transmission time may define an upper bound of tolerable delay based on user or application expectations. Since this total end-to-end transmission time may include the buffer delay period and the network transmission delay period, it should in theory be possible to equalize the end-to-end transmission time for all packets in a sequence by adjusting the buffer delay period to account for the estimated network transmission delay.

Unfortunately, however, estimates of network transmission delay are inaccurate. For instance, although the round-trip transmission time between nodes A and B may be 140 ms, it is unlikely that the one-way transmission times in both directions is 70 ms. Rather, it may be the case that the one-way transmission time from A to B is 90 ms, and the one-way transmission time from B to A is 50 ms. Consequently, if a jitter buffer assumes that the transmission delay from A to B is 70 ms and the predetermined end-to-end transmission time for all packets in a sequence flowing from A to B should be 100 ms (a fair assumption based on current studies), then the jitter buffer may be delay packet play-out for 30 ms (i.e., the difference between the predetermined end-to-end delay of 100 ms and the estimated one-way delay of 70 ms). This buffer period, however, will be insufficient. Packets that arrive at B with a 90 ms network transmission delay will additionally be delayed 30 ms by the buffer, thereby resulting in a 120 ms end-to-end delay, which exceeds the desired 100 ms delay value.

According to the preferred embodiment, the receiver 20 may maintain a second time signal that is synchronized with the first time signal. This may be accomplished in the above example, and without limitation, by equipping or coupling the receiver with a GPS receiver 36 (including GPS antenna 38) for receiving substantially the same time signal from satellite 28 that transmitter 12 receives. Receiver 20 may then, for instance, dynamically determine the actual network transmission delay for each incoming packet in a sequence, by identifying a receiver-time for each packet based on the second time signal and then comparing the receiver-time for the packet with the sender-time for the packet. As with the sender-time, the particular point at the receiving end where the receiver-time is established is not critical; however, the point should be consistent across a plurality of packets in order to provide a proper relative measure of delay. By way of example, and without limitation, the receiver time for each packet may be (i) the time when the packet arrives at the receiver or (ii) the time when the packet is received by the jitter buffer.

Assume by way of example, as illustrated in FIG. 2, that the packets of packet stream 26 arrive at the jitter buffer as stream 40. As shown, assume that receiver 20 (e.g., jitter buffer 34) reads the second clock signal to establish a receiver time for each incoming packet and computes a network transmission delay as the difference between the receiver-time and the sender-time. Assume that as shown in FIG. 2, the receiver-times and delays per packet in stream 36 are as follows:

| Packet | Sender-time | Receiver-time | Transmission delay (since sender-time) |
|---|---|---|---|
| $P_0$ | 0 ms | 50 ms | 50 ms |
| $P_1$ | 10 ms | 55 ms | 45 ms |
| $P_2$ | 20 ms | 75 ms | 55 ms |
| $P_3$ | 30 ms | 80 ms | 50 ms |
| $P_4$ | 40 ms | 90 ms | 50 ms |

Assume next that the jitter buffer is set to substantially equalize the end-to-end transmission times for all successfully transmitted packets in the sequence at 100 ms, in order to optimize play-out quality. Provided with its synchronized, accurate delay measurement, jitter buffer can dynamically do so by computing for each packet a difference between 100 ms and the packet's individual network transmission delay. Thus, the buffer can be set to delay play-out of each packet for the following buffer delay periods, resulting in the indicated play-out times (or, e.g., buffer-release times) and consequent end-to-end transmission times:

| Packet | Sender-Time | Receiver-Time | Trans. Delay | Buffer Delay | Play-out Time |
|---|---|---|---|---|---|
| $P_0$ | 0 ms | 50 ms | 50 ms | 50 ms | 100 ms |
| $P_1$ | 10 ms | 55 ms | 45 ms | 55 ms | 110 ms |
| $P_2$ | 20 ms | 75 ms | 55 ms | 45 ms | 120 ms |
| $P_3$ | 30 ms | 80 ms | 50 ms | 50 ms | 130 ms |
| $P_4$ | 40 ms | 90 ms | 50 ms | 50 ms | 140 ms |

This resulting inter-packet time spacing for play-out is shown by way of example as stream 42 in FIG. 2. Advantageously, the packets may thus be played-out with the same 10 ms inter-packet time spacing as existed or was established at the transmitting end, thus providing for improved signal quality.

The receiver 20 may decode incoming packets during the buffer process in order to expedite processing. Thus, as indicated in FIG. 2, the jitter buffer 34 may include or be functionally coupled with a decoder. Alternatively or additionally, the packets and/or their payload may be decoded after the buffering process is complete. The receiver may further be configured to play-out the decoded media signal, for instance, sending the signal over communications link 44 to output medium 22. In this regard, the receiver may be configured to depacketize the data stream if desired, as indicated by functional block 46 in FIG. 2.

According to another aspect of a preferred embodiment, packet delay measurements based upon synchronized clocks at a transmitting and receiving end (e.g., network transmission delay, and/or delay variance among packets) may be used to establish or adjust fees to charge for transmission of real-time media signals over a packet switched network. In this regard, it is generally appreciated that longer delays in the transmission of a real-time media signals are less desirable, since the signal may be played out to the recipient with a disconcertingly long pause after the signal is generated. Further, it is generally understood that higher jitter (delay variance) in transmission of a real-time media signal decreases the quality of transmission, due to excessive delay or insufficient delay (with resulting packet loss). Therefore, as presently contemplated, an entity that charges for such real-time packet-based transmissions may adjust its fees based at least in part on measurements of such delay and/or jitter.

Delay and/or jitter may be measured directly with respect to the packets as to which the billing entity charges for transmission. This would give a most accurate basis for billing adjustment, since the measurement would reflect the actual delay and/or jitter, and the consequent level of transmission quality, for the actual transmission. Alternatively, delay and/or jitter may be measured with respect to other packets (e.g., test packets or other packets) transmitted in the network, which may be considered representative of transmission quality between a given source and destination (e.g., network devices employed by two conversation participants) and/or transmission quality in the network at a given time, and/or any other measurement that may reasonably bear on how much a billing entity should charge for a given packet-based transmission. Further, the measurement of delay and/or jitter may involve statistical analysis, for example, taking an average or other function across a plurality of packets in a sequence. (Thus, for instance, delay may be measured with respect to a single packet or may be measured by a statistical analysis or function that takes into account a group of packets.)

In any event, where the delay and/or jitter measurement is representative in whole or in part of the delay and/or jitter that is likely to be in effect, or that is in fact in effect, for a particular transmission, the measurement may be considered to be a measurement for that particular transmission. For instance, without limitation, a measurement of transmission delay over a given node-to-node circuit in a network may bear directly on the transmission of a given signal from a first device to a second device, where the route between those devices includes that circuit. Therefore, such delay measurement may be considered a delay measurement for that transmission. Other examples exist as well.

With respect to any given packet, a delay measurement may be taken in any suitable fashion. By way of example, a first device (i.e., transmitting end) in the network may timestamp the packet based on a first time signal and send the packet over the network to a second device (i.e., receiving end). The second device may then employ a second time signal substantially synchronized to the first time signal, in order to identify a receiver-time for the incoming packet. Examples of providing synchronized time signals at a transmitter and receiver, as well as establishing a sender-time and receiver-time for each packet, have been described above and are equally applicable to this aspect of the invention as well.

The delay may be measured by the second device, by the first device, and/or by any other suitable device or system. By way of example and without limitation, the second device may measure transmission delay for a given packet at least in part by computing the difference between the receiver-time and sender-time for the packet. The second device may then send this delay information back to the first device, for instance, over the same network or over a suitable out-of-band channel. Alternatively, as another example, the second device may transmit back to the first device a response packet that indicates the receiver-time (e.g., through use of the well known "PING" procedure), and the first device may itself compute the transmission delay as the difference between the receiver-time and sender-time for the packet. This response packet may be a modified version of the original packet, and/or a copy of the original packet, and/or another packet altogether.

In interactive communications, such as a telephone call, where one party typically pays for the call but transmissions occur in two directions, the delay measurement may include not only delay for transmission from the first device to the second device, but also (or alternatively) delay for transmission from the second device to the first device. Such a delay measurement may be taken, for example and without limitation, by having the first device receive a communication from the second device indicating the receiver-time. The first device may then use the receive time to determine (i) the delay for transmission from the first device to the second device, as indicated by the difference between the receiver-time and the sender-time, and/or (ii) the delay for transmission from the second device to the first device, as indicated by the difference between the receiver-time and the time when the packet arrived back at the first device.

With respect to any plurality of packets, a jitter measurement may be taken in a similar fashion. For instance, as the second device receives a plurality of packets (e.g., in a sequence), the receiving end may measure the delays for each packet and may then evaluate the differences between these delays. The evaluation may take the form of a statistical analysis, as for instance establishing a statistical distribution of delay over a plurality of packets. As a further example, the second device may compute the difference between transmission delays for successive packets in a sequence and may then take an average of those differences, representing the effective jitter or delay variance for transmission of the sequence as a whole. The second device may then convey the results of this analysis to the first device for use in adjusting transmission fees. Alternatively, as described above with respect to delay measurements, the second device may take delay measurements and send information back to the first device, which may then be configured to analyze the delay information to determine the effective jitter.

In the preferred embodiment, if the transmission delay and/or jitter for the transmission of a given packet-based signal (e.g., measured directly, or measured with respect to representative transmissions) exceeds a predetermined threshold level, then the billing entity may decrease its fee for the transmission and/or, at a specified extreme, render the transmission free. Conversely, if the transmission delay and/or jitter for the transmission is less than a predetermined threshold level, then the billing entity may increase its fee for the transmission. These adjustments, and others if desired, may be made, for instance, by establishing a baseline fee and then weighing the fee up or down or applying another function to the fee based on the delay and/or jitter condition.

Figure 3:
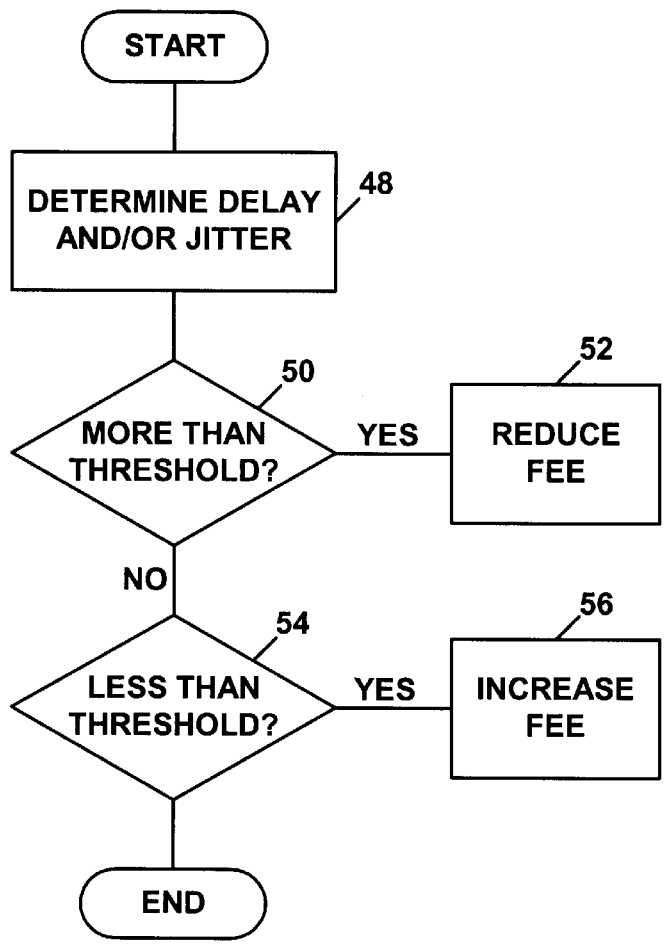
FIG. 3 illustrates an exemplary process flow involved in adjusting transmission fees based on network delay and/or jitter in accordance with a preferred embodiment of the present invention.

These adjustments or bases for establishing transmission fees are illustrated for example in FIG. 3. As shown at block 48 in FIG. 3, a system may determine delay and/or jitter. In turn, at block 50, a decision is made as to whether this delay is more than a predetermined upper threshold. If so, then, at block 52, the fee charged for a transmission is decreased. If not, then at block 54, a determination is made as to whether the delay is less than a predetermined lower threshold. If so, then, at block 56, the fee charged for a transmission is increased.

These upper and lower thresholds are generally matters of design choice. The thresholds may be the same as each other or different from each other. As examples and without limitation, the lower threshold may be up to about 100 ms, and the upper threshold may be about 150 ms to 500 ms. Further, the threshold(s) may be adaptively set based on information about the source and destination for the transmission. For instance, the threshold for a call from New York to China may reasonably be higher than the threshold for a call from New York to Chicago, since transmission distance may suggest longer expected delays.

Of course, other desired billing adjustments based on delay and/or jitter measurements may be made in addition or instead. For example, depending on the magnitude of delay and/or jitter, a differential pricing scheme can be implemented. As another example, a service provider may establish time-limited credits for low quality voice transmissions and/or may award marginal charges or credits for lost packets.

It will further be appreciated that, while a preferred embodiment contemplates use of synchronized delay and/or jitter measurements (i.e., based on synchronized time signals at the transmitting and receiving ends) as a basis for setting and/or adjusting transmission fees, the invention can also extend to use of non-synchronized delay measurements as a basis. By way of example, estimates of transmission delay (e.g., computed on a case-by-case basis from observed standard deviation of network delay such as observed round-trip transmission delay, and/or pre-set based upon a selected standard value) may be used as a basis for adjusting transmission fees. Similarly, estimates of jitter (e.g., based on an analysis of inter-packet time spacing upon receipt at the receiving end) may be used as a basis for adjusting transmission fees.

According to another aspect of a preferred embodiment, delay and/or jitter measurements may be used to select a route for transmission of a real-time media signal. This route may be defined as a particular network, a particular transmission path into and/or within a given network, or any other transmission path that could be used to carry or convey all or part of a real-time media transmission all the way or part of the way between a sending device and a receiving device. By way of example, without limitation, the transmission path could be a service provider (e.g., one ISP versus another), a network (e.g., packet-switched and/or circuit switched), part of a network, a backbone to a network (e.g., backbones to the Internet provided by telecommunications service providers such as Sprint, AT&T and MCI), access to a backbone (e.g., through a LAN or a cable modem, etc.), a bridge between networks, a hop in a network, a processing device (e.g., a switch and/or a router) on a network, or a direct link between the sending and receiving devices.

Figure 4:
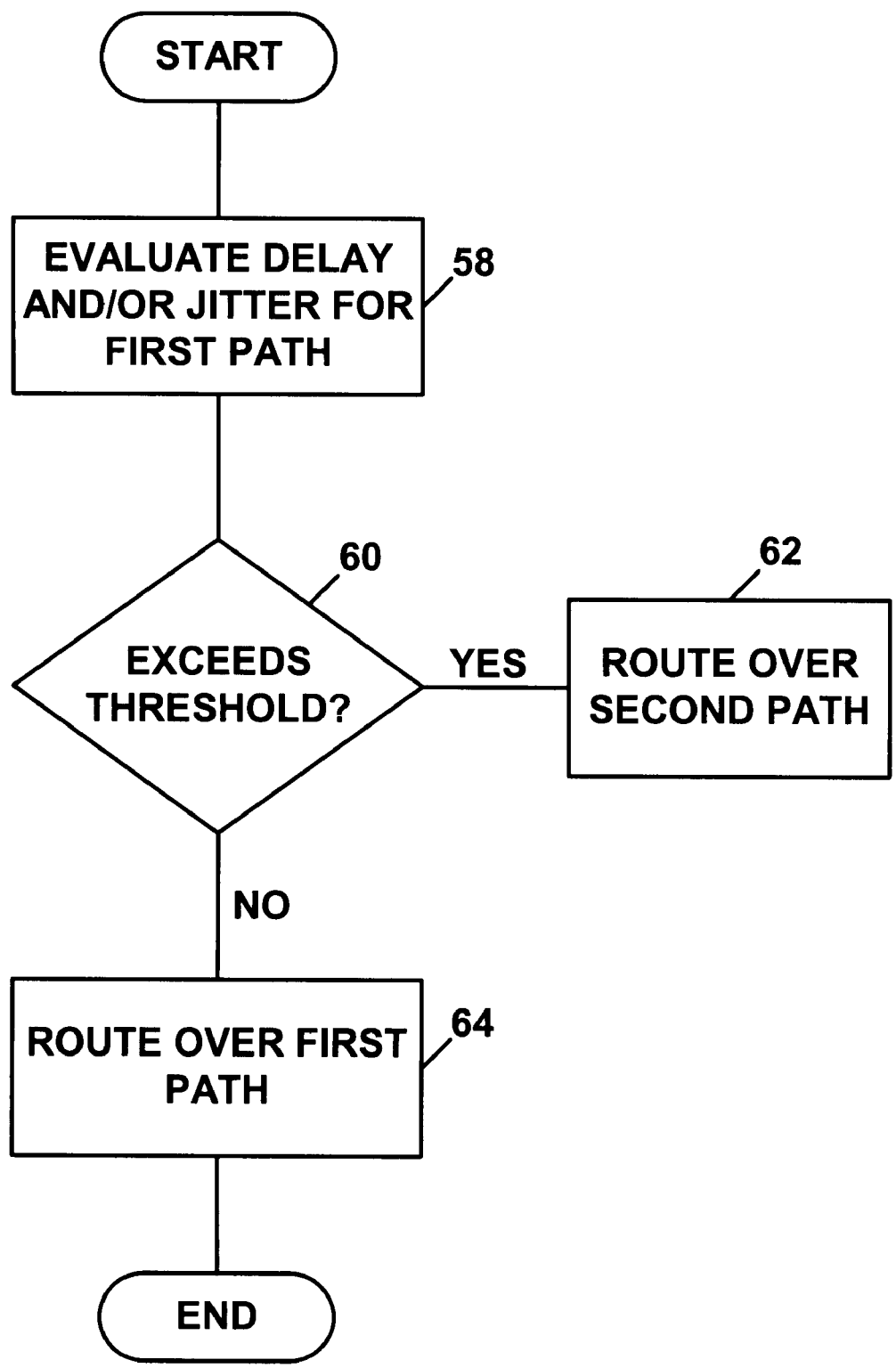
FIG. 4 illustrates an exemplary process flow involved in making a routing decision based on network delay and/or jitter in accordance with a preferred embodiment of the present invention.

According to an exemplary embodiment, for instance, a routing system (e.g., a transmitter or other device or system) may evaluate the delay and/or jitter that is actually in effect or likely to be in effect for transmission of a real-time media signal over a given transmission path from a first device to a second device. If the delay and/or jitter exceeds a predetermined threshold level, then the routing system may opt to instead route the real-time signal over a different transmission path. This system is illustrated by way of example, and without limitation, in FIG. 4. As shown by block 58 in FIG. 4, delay and/or jitter is evaluated for a first transmission path. At block 60, a determination is then made as to whether the delay and/or jitter for that first transmission path exceeds a predetermined level. If so, then, at block 62, the routing system may elect to route the signal over a second transmission path instead. If not, however, then, at block is 64, the routing system may elect to route the signal over the first transmission path.

Figure 5:
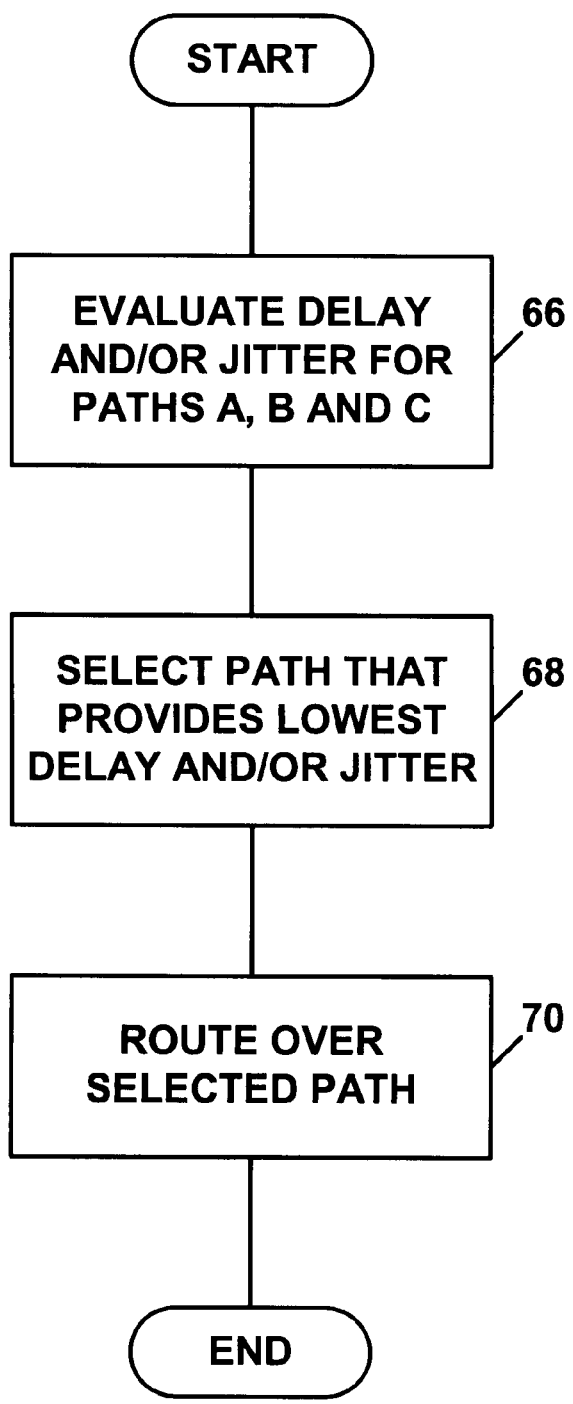
FIG. 5 illustrates another exemplary process flow involved in making a routing decision based on network delay and/or jitter in accordance with a preferred embodiment of the present invention.

Alternatively or additionally, the routing system may evaluate delay and/or jitter for transmission over a plurality of transmission paths and may elect to route the signal over the path that is likely to provide the lowest delay and/or jitter. This system is illustrated by way of example, and without limitation, in FIG. 5. As shown at block 66 in FIG. 5, delay and/or jitter is evaluated for a plurality of possible transmission paths, depicted for example as paths A, B and C. At block 68, a determination is made as to which of these path provides the lowest delay and/or jitter, and a routing system selects that path. At block 70, the routing system may then elect to route the signal over the selected path.

Still alternatively, the routing system may route copies of the same real-time media signal (or part of the signal, such as one or more packets) simultaneously over a plurality of different transmission paths. The receiving end may be configured to play out the copy of the signal or signal portion that encountered the lowest delay and/or jitter.

Further, as with the use of delay and/or jitter for billing adjustments, the routing system may regularly measure the delay and/or jitter over a particular transmission path and/or over a plurality of different transmission paths and then refer to such delay and/or jitter measurement(s) to make a routing decision for a particular media transmission.

The delay and/or jitter measurement may be taken in any suitable fashion. Examples of such measurements are provided above with respect to billing adjustments, and those examples, can apply equally in the context of making routing decisions. Additionally, as described above with respect to the use of delay and/or jitter measurements to make billing adjustments, either synchronized and/or non-synchronized delay and/or jitter measurements can be used to make routing decisions. However, in the preferred embodiment, the measurements are synchronized, since synchronized measurements should provide a more accurate and reliable basis for making routing decisions.

By way of example, and without limitation, the transmitting end may measure the transmission delay that is likely to be in effect for transmission of a given real-time media signal to a receiving end over a given packet switched network such as the Internet. If the receiving end determines that the measured delay exceeds a predetermined level (indicating a likelihood of inferior transmission quality, for instance), then the transmitting end may opt to instead transmit the real-time media signal over a circuit switched network such as the PSTN. Alternatively, the transmitting end may opt to transmit the signal over any other network or transmission path to convey the signal to the receiving end.

As another example, without limitation, a given routing system (e.g., a network access server such as will be described below) may be configured with several different output ports or other suitable arrangement for selectively routing a given Internet transmission to one of a plurality of possible Internet backbones. According to the preferred embodiment, the routing system may then evaluate the delay and/or jitter that would be likely to be in effect, or that is actually in effect, for transmission via each of these various backbones. The routing system may then select the particular backbone that will offer the least delay and/or jitter (perhaps considering other factors in combination as well) and then route a media signal via the selected backbone.

Still further, an advantage of making routing decisions based on synchronized delay measurements may be understood with reference to the following example. Assume for instance that a real-time telephony signal is to be transmitted from New York to San Francisco and that two possible transmission paths ("routes") are available for this transmission, route A and route B. Empirical measurements have established that route A provides a 10% loss and a round-trip delay of 140 ms, and route B provides a 5% loss and a round-trip delay of 200 ms.

Without a synchronized delay measurement, a routing system could estimate the one-way transmission delays from New York to San Francisco to be 70 ms on route A and 100 ms on route B (i.e., half of the respective round-trip delays). Based on this non-synchronized delay evaluation, the routing system would choose route A, since it has less delay and since we may assume that in real-time telephony communications, the delay factor is more important than the loss factor.

Assume next, however, that a synchronized delay measurement indicates in fact that the one-way transmission delays on route A are 100 ms from New York to San Francisco and 40 ms from San Francisco to New York (for a total round trip delay of 140 ms), and the one-way transmission delays on route B are 50 ms from New York to San Francisco and 150 ms from San Francisco to New York (for a total round-trip delay of 200 ms). Given this information, the routing system may advantageously elect to route the signal via route B, to provide improved delay of only 50 ms instead of the 100 ms delay that would be likely on route A. Of course, in the reverse direction, a routing system may elect route A instead, since it will provide less delay in that direction.

In accordance with a preferred embodiment of the present invention, a transmitter and/or receiver and/or any other device, system, or entity may employ and/or facilitate any of the above-described functions and/or any combination of one or more of these functions. These functions may be referred to for convenience as synchronized buffering (buffering based on synchronized clocks), delay-based billing (evaluating delay and/or jitter for use in establishing transmission fees and/or setting or adjusting those fees accordingly) and delay-based routing (evaluating delay and/or jitter for use in selecting a preferred routing path). Thus, by way of example, and without any limitation, a network device may be configured to provide synchronized buffering for incoming packet streams, to provide delay-based routing for outgoing packet streams, and to provide delay-based billing to facilitate establishment of appropriate transmission fee schedules.

A network device suitable for carrying out part or all of these functions is a network access server (NAS) or remote access server (RAS), which may be configured to provide network connectivity for subscribers via any suitable communications link such as, for example, the PSTN (e.g., a telephone line) or a LAN. Either or both the transmitter 12 and receiver 20 shown in FIG. 2 may be an NAS. In the context of internet telephony, for example, the NAS may serve as an Internet Telephony Gateway (ITG).

Exemplary network access servers are commercially available from 3Com Corporation and other telecommunications equipment manufacturers such as Ascend Communications, Livingston Enterprises, Multitech and Cisco. A representative NAS is the Total Control Enterprise Network Hub from 3Com Corporation, as described in the patent of Dale M. Walsh, et al., U.S. Pat. No. 5,597,595 ("the Walsh patent"), which is fully incorporated herein by reference and to which the reader is directed for additional details. This NAS has a telephone line interface that can be connected to a high-speed multiplexed digital telephone line, such as a T1 line or an ISDN line. The NAS further provides a plurality of digital modems to perform signal conversions (such as sampling, compressing and packetizing) on the data from the telephone line channels and a bus network connecting the modems to a network interface card or module. Examples of such network interface cards are the NetServer™ and EdgeServer™ cards from 3Com Corporation. The network interface card in turn couples the NAS to a local or wide area network, such as the ISP backbone network or the Internet.

Figure 6:
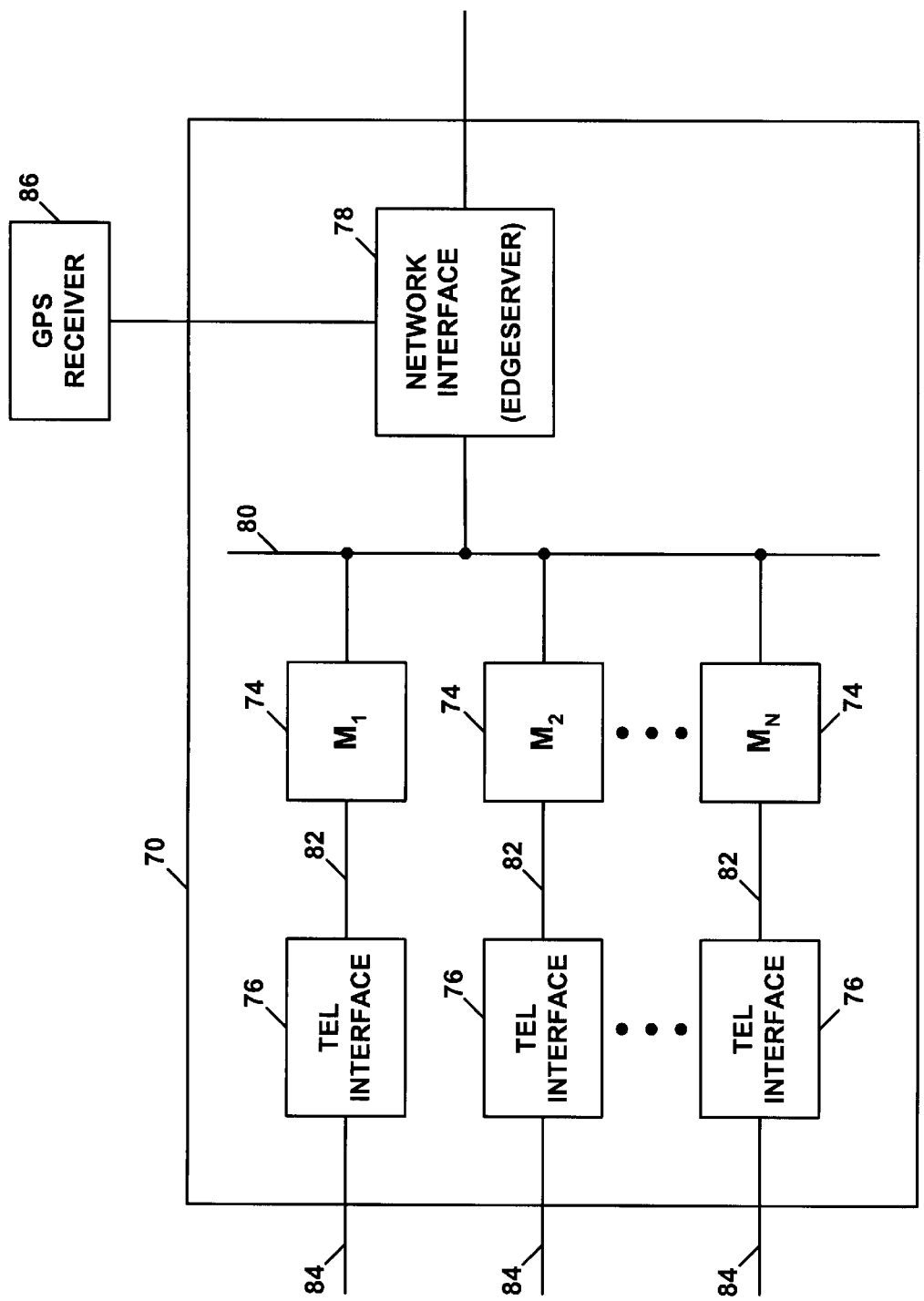
FIG. 6 illustrates an exemplary network device that may be used to perform functions in accordance with a preferred embodiment of the present invention.

FIG. 6 shows a simplified block diagram of an exemplary ITG 72 suitable for use in the preferred embodiment. Exemplary ITG 72 includes a plurality of high density modem modules 74, each having (or being coupled with) a telephone line interface 76 for interfacing with the PSTN two-wire analog, T1, E1, T3, E3, ISDN and/or primary rate services. The high density modem modules 74 communicate with a network interface 78 over a packet system bus 80. The high density modem modules, the telephone interfaces and the network interface are preferably on individual printed circuit boards or cards arranged in a chassis. The high density modem modules are "high density" in that each contains a high density digital signal processing (DSP) configuration capable of handling any desired number of channels, such as, for example, 23, 24, 30 or 672 DS 0 channels. An exemplary high density DSP is the HiPer DSP available from 3Com Corporation.

By providing a set of high density modem cards 74 and a robust computing platform in the network interface 78, a single chassis can process many hundreds of calls through the device simultaneously. In this regard, each modem card 74 performs modem functions for a large number of channels on the telephone line. For example, each high density modem card 32 may perform modem functions for 23 B channels plus 1 D channel for an ISDN Primary Rate Interface, 24 DS0 channels for a T1 line and 30 channels for an E1 line.

In the exemplary NAS of FIG. 6, each high density modem card 32 has its own telephone line interface 76, connected to an ISDN PRI or T1 line for instance, The telephone line interface 76 is connected to the high density modem cards by a TDM bus 82, as described in the Walsh patent. The telephone line interface 76 is composed of two separate modules (not shown), an incoming call interface module and an incoming call application module. For T1 signals, the interface module physically receives incoming T1 span lines at connection 84, converts the signal in a digital TTL format and delivers the signal to the incoming call application module. The interface module provides a channel switching unit (CSU) interface, which recovers clock signals and data from the incoming T1 signals and also provides the transmission of outgoing digital telephone signals representing digital data to the line at connection 84. The application module provides framing of recovered T1 data to extract the T1 DS0 channel data and then switches the channel data twenty four time slots on a TDM bus 82 to the corresponding high density modem module 74. Of course, the telephone interface may take other forms as well.

The high density modem cards 74 are connected to the network interface card via a high-speed parallel packet bus 80, similar to that described in the Walsh patent. The number of high density modem cards 74 and associated telephone line interface cards 76 is essentially arbitrary, but 10 to 24 such cards are typical in a high density gateway application today, providing modem functionality for between 240 and 576 DS0 channels.

The network interface 78 may be a 3Com EdgeServer™ card or other suitable interface. The EdgeServer™ card consists of a general purpose computing platform (such as an IBM PC) running an operating system such as Windows NT™ from Microsoft Corporation, or UNIX. The network interface card 78 contains software and hardware modules to perform call routing, modem configuration and other features as set forth and described for the gateway modules in the Walsh patent as well as in the patent of Baum et al., U.S. Pat. No. 5,577,105, which is also fully incorporated herein by reference. Further details of the design and features of the EdgeServer™ card 78 are set forth in the U.S. patent application of Verthein et al., Application Ser. No. 08/813,173, which is fully incorporated herein by reference as well. The network interface card may be programmed with an appropriate set of machine language instructions stored in a memory and executed by a processor to carry out the various functions described and claimed herein, such as dynamic synchronized jitter buffering, delay measurement and/or jitter measurement.

As described above, in the preferred embodiment, the NAS 70 further includes or is interconnected to a GPS receiver 86 or other suitable mechanism for receiving and/or maintaining a time signal established by a common clock source such as a GPS satellite. The GPS receiver may, for instance, include an exterior antenna for receiving satellite transmissions. An example of a suitable GPS receiver is available from Datum Incorporated, as Part No. 34097-61. The NAS 70 may employ the time signal to identify sender-times for outgoing packets and/or receiver-times for incoming packets.

Preferred embodiments of the present invention have been described herein. It will be understood, however, that changes may be made to the various features described without departing from the true spirit and scope of the invention, as defined by the following claims.

We claim:

1. In a packet switched network in which a real-time media signal is encoded into a sequence of packets and the packets are sequentially transmitted over the network from a transmitting-end and destined for a receiving-end, each packet being marked at the transmitting-end with a sender-time based on a first clock signal at the transmitting-end, a method of improving end-to-end communication of said real-time media signal comprising, in combination, at said receiving-end:

maintaining a second clock signal substantially synchronized to the first clock signal, so that the second clock signal reflects substantially the same time as the first clock signal; and for each of at least a plurality of incoming packets, retaining said packet for a buffer period, and releasing said packet for play-out in response to said second clock signal indicating a time that is substantially a predetermined delay period after said sender-time.

2. A method as claimed in claim 1, wherein retaining said packet for a buffer period, and releasing said packet for play-out in response to said second clock signal indicating a time that is substantially a predetermined delay period after said sender-time comprises, in combination:

determining a network transmission delay for said packet, said network transmission delay being based at least in part on a comparison of said sender-time with a receiver-time based on said second clock signal, and setting said buffer period for said packet, said buffer period being based at least in part on a difference between said network transmission delay and said predetermined delay period, whereby, said buffer period may vary from packet to packet based at least in part on a variance in said network transmission delay from packet to packet.

3. A method as claimed in claim 2, wherein said predetermined delay period is a predetermined end-to-end transmission delay.

4. A method as claimed in claim 2, wherein the receiver-time for a given packet identifies a time when said given packet is received at said receiving-end.

5. A method as claimed in claim 2, wherein the receiver-time for a given packet identifies a time when said given packet is received by a jitter buffer at said receiving-end.

6. A method as claimed in claim 1, wherein the sender-time for a given packet identifies a time when a first sample of payload in said given packet is taken.

7. A method as claimed in claim 1, wherein the sender-time for a given packet identifies a time when said given packet is sent to the network from said transmitting-end.

8. A method as claimed in claim 1, wherein said network comprises an IP network.

9. A method as claimed in claim 1, wherein said real-time media signal comprises a telephony signal.

10. A method as claimed in claim 1, wherein said real-time media signal comprises a video signal.

11. A method as claimed in claim 1, wherein said real-time media signal comprises a voice-band signal.

12. A method as claimed in claim 11, wherein said voice-band signal comprises a fax signal.

13. A method as claimed in claim 11, wherein said voice-band signal comprises a modem signal.

14. A method as claimed in claim 1, wherein said real-time media signal comprises a voice signal.

15. A method as claimed in claim 1, wherein said first clock signal and said second clock signal originate from a common time clock.

16. A method as claimed in claim 15, wherein said common time clock provides said first and second clock signals via satellite transmission, and wherein maintaining said second clock signal at said receiving-end comprises receiving said satellite transmission.

17. A method as claimed in claim 15, wherein said common time clock is maintained by a global positioning system (GPS), and wherein receiving said satellite transmission comprises employing a GPS receiver.

18. A method as claimed in claim 15, wherein said common time clock provides said first and second clock signals via an out-of-band transmission.

19. In a packet switched network in which (i) a real-time media signal is encoded into a sequence of packets, (ii) the packets are sequentially transmitted over the network from a transmitting-end and destined for receipt at a receiving-end, each packet being marked at the transmitting-end with a sender-time based on a first clock signal at the transmitting-end, and (iii) at least a plurality of the packets are each received at the receiving-end, retained by a jitter buffer for a buffer delay period, and played out, a method of improving end-to-end communication of said real-time media signal comprising, in combination, at said receiving-end:

maintaining a second clock signal substantially synchronized to the first clock signal; and for each of at least a plurality of incoming packets, (a) determining a network transmission delay for said packet, said network transmission delay being based at least in part on a comparison of said sender-time with a receiver-time based on said second clock signal, and (b) setting said buffer delay period for said packet, said buffer delay period being based at least in part on a difference between said network transmission delay and a predetermined end-to-end transmission delay, whereby, said buffer delay period may vary from packet to packet based at least in part on a variance in said network transmission delay from packet to packet.

20. A method as claimed in claim 19, wherein the sender-time for a given packet identifies a time when a first sample of payload in said given packet is taken.

21. In a packet switched network in which a real-time media signal is encoded into a sequence of packets and the packets are sequentially transmitted over the network from a transmitting-end and destined for a receiving-end, said transmitting-end including a first time signal, each of said packets being marked at said transmitting-end with a sender-time based on said first time signal, a receiving device at said receiving-end, said receiving device receiving at least a plurality of said packets as incoming packets, and said receiving device comprising, in combination:

a processor;

a memory;

a second time signal substantially synchronized to the first time signal, so that the second time signal reflects substantially the same time as the first time signal; and a plurality of machine language instructions stored in said memory and executable by said processor for performing at least the following functions with respect to each of at least a plurality of said incoming packets:

(a) delaying play-out of said incoming packet for a buffer period, and (b) releasing said incoming packet for play-out in response to said second time signal indicating a time that is substantially a predetermined delay period after said sender-time.

22. A device as claimed in claim 21, wherein delaying play-out of said incoming packet for a buffer period comprises, in combination:

(i) identifying a receiver-time for said incoming packet based on said second time signal;

(ii) determining a network transmission delay for said incoming packet, said network transmission delay being based at least in part on a comparison of the sender-time for said incoming packet with the receiver-time for said incoming packet, and (iii) computing said buffer period for said incoming packet, said buffer period being based at least in part on a difference between said network transmission delay and said predetermined delay period, whereby, said buffer period may vary from packet to packet based at least in part on a variance in said network transmission delay from packet to packet.

23. A device as claimed in claim 22, wherein the receiver-time for a given packet identifies a time when said packet is received at said receiving-end.

24. A device as claimed in claim 21, wherein the sender-time for a given packet identifies a time when a first sample of payload-in said given packet is taken.

25. A device as claimed in claim 21, wherein the sender-time for a given packet identifies a time when said given packet is sent to the network from said transmitting-end.

26. A device as claimed in claim 21, wherein said network comprises an IP network.

27. A device as claimed in claim 21, wherein said real-time media signal comprises a telephony signal.

28. A device as claimed in claim 21, wherein said real-time media signal comprises a voice signal.

29. A device as claimed in claim 21, wherein said real-time media signal comprises a video signal.

30. A device as claimed in claim 21, wherein said real-time media signal comprises a voice-band signal.

31. A device as claimed in claim 30, wherein said voice-band signal comprises a fax signal.

32. A device as claimed in claim 30, wherein said voice-band signal comprises a modem signal.

33. A device as claimed in claim 21, wherein said first time signal and said second signal originate from a common time clock.

34. A device as claimed in claim 33, wherein said common time clock provides said first and second clock signals via satellite transmission, and wherein said receiving device is coupled with an antenna for receiving said satellite transmission.

35. A device as claimed in claim 33, wherein said common time clock provides said first and second clock signals via out-of-band transmission.

36. In a packet switched network in which a real-time media signal is encoded into a sequence of packets and the packets are sequentially transmitted over the network from a transmitting-end and destined for a receiving-end, said transmitting-end including a first time signal, each of said packets being marked at said transmitting-end with a sender-time based on said first time signal, a receiving device at said receiving-end, said receiving device receiving at least a plurality of said packets as incoming packets, and said receiving device comprising, in combination:

a processor;

a memory;

a second time signal substantially synchronized to the first time signal; and a plurality of machine language instructions stored in said memory and executable by said processor for performing at least the following functions with respect to each of at least a plurality of said incoming packets:

(a) identifying a receiver-time for said incoming packet based on said second time signal;

(b) determining a network transmission delay for said incoming packet, said network transmission delay being based at least in part on a comparison of the sender-time for said incoming packet with the receiver-time for said incoming packet, (c) computing a buffer delay period for said incoming packet, said buffer delay period being based at least in part on a difference between said network transmission delay and a predetermined end-to-end transmission delay, and (d) upon expiration of said buffer delay period, releasing said packet for play-out, whereby, said buffer delay period may vary from packet to packet based at least in part on a variance in said network transmission delay from packet to packet.

\* \* \* \* \*